United States Patent [19]

Kriz et al.

[11] Patent Number: 4,776,274
[45] Date of Patent: Oct. 11, 1988

[54] PROXIMITY FUZING ARRANGEMENT

[75] Inventors: Helmut Kriz, Ruckersdorf; Horst-Ulf Schottelius, Nuremberg, both of Fed. Rep. of Germany

[73] Assignee: Diehl GmbH & Co., Nuremberg, Fed. Rep. of Germany

[21] Appl. No.: 47,416

[22] Filed: May 6, 1987

[30] Foreign Application Priority Data

May 6, 1986 [DE] Fed. Rep. of Germany ....... 3615266

[51] Int. Cl.⁴ .......................... F42C 13/02; F41G 7/26
[52] U.S. Cl. .................................... 102/213; 244/3.16
[58] Field of Search ......................... 102/213; 244/3.16

[56] References Cited

U.S. PATENT DOCUMENTS

| 3,000,307 | 9/1961 | Trotter, Jr. | 244/3.16 |
| 3,642,233 | 2/1972 | Bezerie | 102/213 |
| 3,935,818 | 2/1976 | Johnson et al. | 102/213 |
| 4,185,560 | 1/1980 | Levine | 102/213 |
| 4,193,688 | 3/1980 | Watkins | 244/3.16 |
| 4,309,946 | 1/1982 | Block | 102/213 |
| 4,711,413 | 12/1987 | Stessen | 244/3.16 |

FOREIGN PATENT DOCUMENTS

| 3435634 | 4/1986 | Fed. Rep. of Germany. |
| 1584139 | 2/1981 | United Kingdom. |
| 2166314 | 4/1986 | United Kingdom .............. 244/3.16 |
| 2188507 | 9/1987 | United Kingdom. |
| 2190177 | 11/1987 | United Kingdom. |

Primary Examiner—Charles T. Jordan
Attorney, Agent, or Firm—Scully, Scott, Murphy & Presser

[57] ABSTRACT

A proximity fuzing arrangement for an airborne body which is equipped with a reflective beam range-finding device. The path of the beam of the range-finding device extends through a point which is located eccentrically offset relative to and rotates about the longitudinal axis of the airborne body behind a collective or focusing optic, and which extends along a variable viewing angle relative to the longitudinal axis of the airborne body. The combination of a passive infrared-target tracking arrangement with an active-laser range-finding device behind the same large collective or focusing optic, is thereby especially suited for an increase in the power of a rapid air defense-airborne body against target objects which enter into the atmosphere in a steep ballistic trajectory and which are thereby intensely heated.

11 Claims, 2 Drawing Sheets

PROXIMITY FUZING ARRANGEMENT

BACKGROUND OF THE INVENTION

1. Field of the Invention

The present invention relates to a proximity fuzing arrangement for an airborne body which is equipped with a reflective beam range-finding device.

2. Discussion of the Prior Art

A proximity fuzing device of the type referred to herein is disclosed in U.S. Pat. No. 4,309,946 with regard to the utilization of a laser range-finding device, and is known from U.S. Pat. No. 4,185,560 in connection with the utilization of a radar range-finding device. For the practical realization, in such devices, it is functionally problematic that the beam opening or aperture angle of the energy which is radiated from the transmitter of the reflective-beam position-finding device should be inherently as small as possible, in order to reflect as much as possible of the energy generated at the target object, and to thereby obtain an optimum energy balance at the receiving end; whereas, on the other hand, an intensely collimated or focused transmission beam will easily lose the target object due to the changes in position relative to the approaching interceptor projectile. This loss of the detected target object thereafter necessitates a time-consuming switching over to a searching program up to the attainment of a renewed detection of the target. However, in the interim, during the interval of the lost detection of the target, the conditions with respect to the course and distance between the target object and the intercepting airborne body may have become so inexpedient that, because of aerodynamic reasons, it is no longer possible to maneuver the intercepting airborne body sufficiently close to the target object for the functioning of its warhead. On the other hand, the danger of the loss of the target detection is somewhat lessened at a less intensively collimated beam of the transmitting energy; but, due to the larger diameter of the beam, the target tracking which is obtained from the reflective-beam position-finding arrangement is not as precise, and especially the precision in evaluating the energy reflected by the target object is much poorer at the receiving end, inasmuch as, in actuality, only a smaller portion of the beam cross-section is reflected by the target object and, for the remainder, the receiver takes up surroundings and background radiation; in effect, is actuated under an extremely unfavorable signal/clutter relationship.

SUMMARY OF THE INVENTION

Accordingly, in recognition of these conditions, it is an object of the present invention to improve upon the mode of operation and thereby the range of utilization of an arrangement of the type under consideration which provides a more expedient energy and information balance at the receiving end.

The foregoing object is inventively achieved through the provision of an arrangement of the above-mentioned type wherein the path of the beam of the range-finding device extends through a point which is located eccentrically offset relative to and which point rotates about the longitudinal axis of the airborne body behind a collective or focusing optic, and which extends along a variable viewing angle relative to the longitudinal axis of the airborne body.

In accordance with the foregoing, through the mathematical rules of the beam geometry of a focusing optic there is effected not only the collimation or focusing of the radiated and the again received energy of a reflective beam-position finding and range-finding device, but also an optimization of the focal point in the detonation distance of interest from the interceptor airborne body to the target object, and a beam or sighting line displacement during the course of approaching the target object. Expediently, the navigation of the approach to the target object is hereby not carried out from the active range-finding device which is provided for determining of the detonating point, but from a passive target searching and target tracking device, which operates in accordance under the same mathematical rules of the optical-beam geometry through a collective or focusing optic, and in accordance with the type of sensor equipment, can be designed for either a simple target-tracking navigation or for the collision point projection pursuant to the rules of proportional navigation.

Hereby, pursuant to this modification, the inventive object represents a combination of an active reflective beam range-finding device with a passive target searching and tracking arrangement as described as an alternate solution in German Published Patent Application No. 34 35 634; with the employment of the same large-apertured focusing optic, as well as for the tasks of the passively operating target-tracking device and also the tasks of the actively operating arrangement for the range-dependent triggering of the detonating signal. Within the same plane of detection there can be arranged sensor elements which are offset relative to each other for the passive arrangement, and receiving elements for the active arrangement behind the same optic, such that there is constantly maintained from the passive target tracking device an optimally focused beam of the active range-finding device directed against the initially acquired and tracked target object.

For the processing of the received signals, it is of advantage that the passive target tracking device and the active range-finding can operate within the same spectral range at mutually clearly distinguished frequencies; which, on the one hand, allows for a frequency-selective signal processing for the mode of operation of the signal processing for the follow-up guidance arrangement and, on the other hand, for that of the proximity fuse device. At a preferred realization of the invention within the infrared spectral range, the sensor elements for the passive operation are preferably optimized to radiation wavelengths within the known so-called atmospheric windows; in effect, at 4 $\mu$ or, respectively, at 10 $\mu$; whereas, for the active infrared-laser range-finding devices, there can be employed a transmitter with a laser diode for a wavelength within the range of 180 nm up to 1.5 $\mu$.

The inventive concept, especially in the combination of the passive infrared-target tracking arrangement with the active-laser range-finding device behind the same large collective or focusing optic, is thereby especially suited for an increase in the power of a rapid air defense-airborne body against target objects which enter into the atmosphere in a steep ballistic trajectory and which are thereby intensely heated.

BRIEF DESCRIPTION OF THE DRAWINGS

Further alternatives and modifications, as well as additional features and advantages of the invention can now be readily ascertained from the following detailed description of a proximity fuzing arrangement which is illustrated by preferred embodiments thereof, and taken in conjunction with the accompanying drawings; in which.

DETAILED DESCRIPTION

Figure 1:
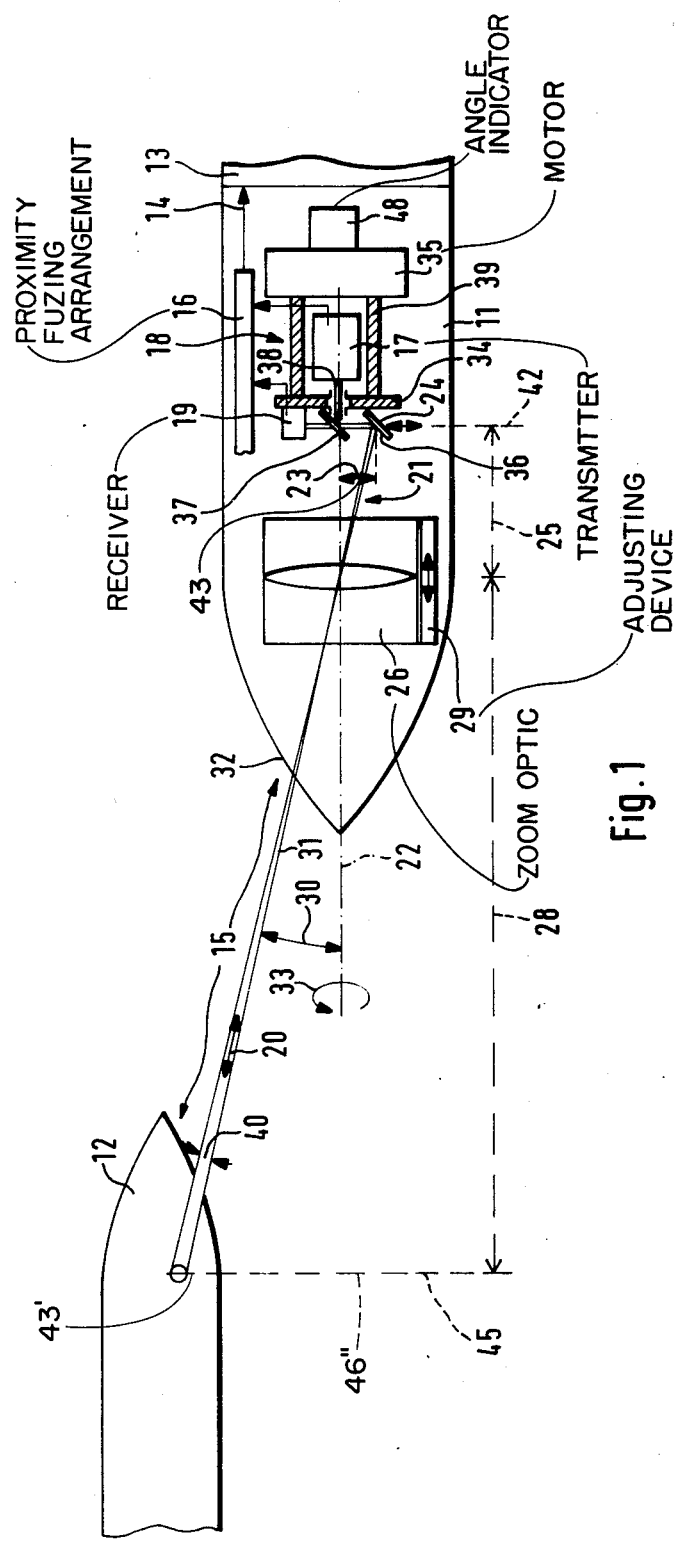
FIG. 1 illustrates an example of a reflective beam range-finding device assembled in an airborne body.

Referring to the airborne body 11, the latter preferably pertains to an extremely rapidly flying defensive or interceptor projectile which is to be employed against a target object 12 in a ballistic flight or which is powered with its own propulsion unit; and which is attacked, for instance, through the intermediary of a highly-energetic fragment-forming warhead 13; in essence, destroyed or at least rendered inoperative. For this purpose, the warhead 13 must be activated by a triggering signal 14, when there is reached an approach of the defensive or intercepting airborne body 11 to the target object 12 to within a functionally expedient range or distance 15, inasmuch as, particularly at a higher relative approach velocity, such as a closer frontal approach of the airborne body 11 to its target object 12, because of aerodynamic reasons from the standpoint of the defense airborne body 11, as a rule, it is not possible to count on a direct hit against the target object 12.

For the rapid and precise, continual measurement of the range or distance 15 to the target, the airborne body 11 is equipped with a proximity fuzing arrangement 16, which is essentially constituted of a pulse timing or a phase meter (power-factor measuring device), which is cyclically triggered from the transmitter 17 of a reflective-beam range-finding device 18 and controlled from its receiver 19. With respect to the energy 20 which is transmitted for the mode of operation of this range-finding device 18 to the target object 12 (in a continuous-wave operation or in a pulsed operation) and which is reflected at the target object 12, this preferably pertains to radiation energy in the IR spectral range of the operating mode of a semiconductor laser-diode as the transmitter 17 with a receiver 19 in the configuration of an infrared detector element, which possesses a sensitivity maximum in the neighborhood of this radiation frequency; and as is known per se from the technology relating to laser range-finding.

The beam path 21 of the reflected energy 20 for the range-finding measurement extends, in the illustrated exemplary embodiment, through a point 24 which is located eccentrically of the longitudinal axis 22 of the airborne body; in effect, offset by a radial distance 23 relative to this longitudinal axis 22 at a focusing distance 25 behind a collective or focusing optic 26, through which there is determined the target object 12, which normally is also located outside of the longitudinal axis 22 of the airborne body, at the distance 28 which is relevant for the geometric optics.

Hereby, the optic 26, which in this case is located in the longitudinal axis 22 of the airborne body, relates to a zoom optic; in effect, relates to an optic 26 with a focal distance which is variable through an adjusting device 29 (the optical zoom system in the form of a grouping of convex and concave lenses which are differently positionable relative to each other, for purposes of simplification of the representation shown in the drawing, is symbolized by means of a single focusing lens).

In accordance with the rules relating to the beam geometry for such a zoom optic 26, a change in the focal distance by means of the adjusting device 29 leads to a variation in the viewing angle 30 between the longitudinal axis 22 of the airborne body and the momentary sighting line 31, corresponding to the center line of the spread of the energy 20, through a beam or radiation-permeable region in the dome 32 of the head end of the airborne body 11 at a presently well focused (point-shaped) image in the plane of projection of the radiation energy 20 which is reflected by the target object 12, in which plane there is located the previously-mentioned point 24.

When the point 24 circulates about the longitudinal axis 22 of the airborne body, the sighting line 31 subtends the generatrix of the shell surface of an acutely-angled cone with a cone aperture angle which comprises double the viewing angle 30. In order that this rotation 33 remains independent of any spin of the airborne body 11, the point 24 is expediently located on a disc 34 which rotates concentrically with the longitudinal axis 22 of the airborne body, and wherein the disc is driven by a motor which is fixed to the airborne body.

The sighting line 31 scans a ring-shaped spatial area in the plane 45 of the distance for the presence of a reflecting target object 12; and when the distance 15 to the target which is measured in the direction of the sighting line 31 corresponds to the operationally pregiven fuse triggering range, a detonating signal 14 is then transmitted to the warhead 13.

Principally, the reflective-beam range-finding device 18; in effect, its transmitter 17 together with its receiver 19, can be arranged at the described point 24 in the path of the beam 21; in essence, arranged on the rotatable disc 34. However, from an apparatus standpoint (namely, technologically with regard to operation and installation) it is more expedient that at least one operational component of the range-finding device 18, in the illustrated embodiment its laser-diode transmitter 17, is arranged so as to be fixed to the airborne body; while, in the exemplary representation, the other element of the range-finding device 18; in effect, the receiver 19, is arranged on the disc 34 at a location which is offset relative to the point 24. In the point 24 itself, there is merely mounted a reflector 36, which deflects the beam path 21 extending through the optic 26 in a direction transverse to the longitudinal axis 22 of the airborne body against the diametrically oppositely-located receiver 19. Located in front of the latter, in the longitudinal axis 22, is a further in this case partly transmissive reflector 37, by means of which the radiation energy from the transmitter 17 introduced through the center of the disc 34 coaxially with the longitudinal axis 22 of the airborne body, is deflected to the first-mentioned reflector 36. The laser-transmitter 17 which is fixed to the airborne body is thus located concentrically behind the central opening 38; for example, in a hollow shaft 39 provided for the rotary connection from the motor 35 to the disc 34. Basically, at the same reflector equipping of the disc 34, it is also possible to exchange the positioning of the transmitter 17 and that of the receiver 19 with respect to each other.

For a precise determination of the range or distance in the detonating or fuzing device 16, it is desirable to obtain the possibly best focused reflectivebeam position-finding energy 20, such that the receiver 19 is excited with the greatest possible signal/clutter ratio, since the received energy will then (almost) completely originate from the reflection at the target object 12 which is of interest and thereby (possibly) will not contain any energy within the same spectral range from the surroundings and the background area about the target object 12.

On the other hand, by means of energy 20 which is well focused within a sighting line 31, it is difficult to find a target object 20 of limited dimensions within the surrounding background; in essence, after the detection, due to relatively changes in course between the intercepting airborne body 11 and the target object 12, the latter can be again easily lost. For a rapid target acquisition and a good target retention, it would be desirable to have a wider aperture angle 40 with a weakly focused radiation energy 20; with the mentioned disadvantage, that because of the poor signal/clutter relationship, the mode of operation of the proximity fuzing arrangement 16 becomes less precise and more susceptible to disruptions.

Figure 2:
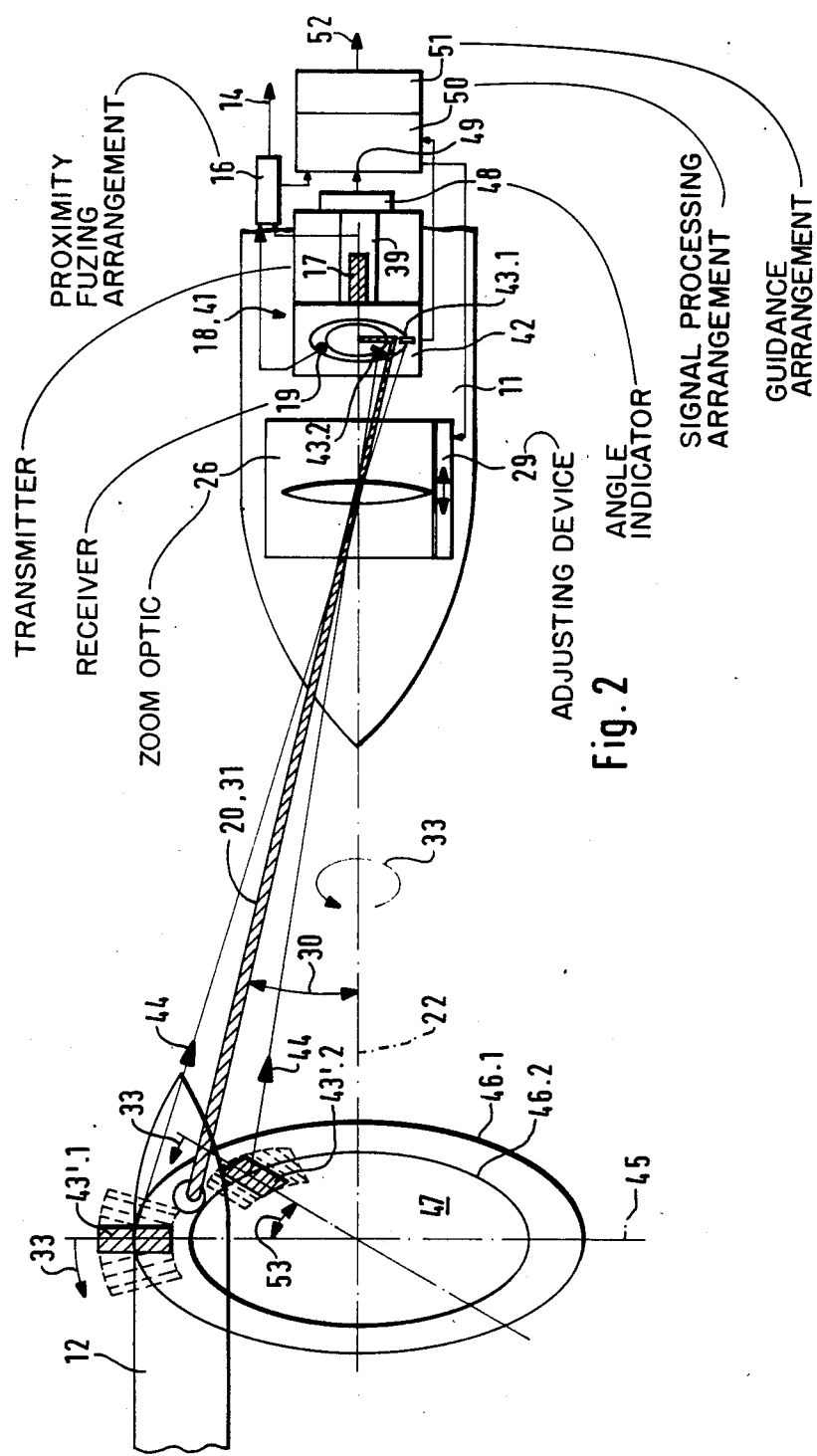
FIG. 2 illustrates an assembly pursuant to FIG. 1 in combination with detectors for a target searching and tracking arrangement.

An extremely elegant solution of these inherently contradictory requirements is obtained, on the one hand, for a rapid target detection or acquisition and a good target retention, as well as, on the other hand, a precise initiation of the detonating signal 14, when the active range-finding device 18 pursuant to FIG. 2 is effectuated and operated in combination with a passive target searching and tracking arrangement 41, which operates under a shifted frequency within the same spectral range, so that the same large-apertured optic 26 can be unitarily and concurrently employed for both systems.

With respect to the details in the apparatus and operation of the target searching and tracking arrangement 41, which is illustrated only schematically in FIG. 2 for purposes of clarity, reference is made to the abovementioned German OS No. 34 35 634, and the modified implementation with regard to the beam geometry in accordance with German Patent Application No. P 36 09 774.8. It is important, that generally within the plane of projection 42 (for example, on the rotatable disc 34) in which there is located the described sighting line-deflecting point 24, and (somewhat) at the same axial distance 23 from the longitudinal axis 22 of the airborne body, (at least one) a sensor element 43 is arranged in the path 21 of the beam behind the focusing optics 26, which element delivers electrical energy in conformance with the level of the excitation by the radiation energy 44, which emanates from the detected target object 12 (for example, from its propulsion unit or due to the heating up of its structure in the atmospheric air onflow).

For purposes of clarification, represented (enlarged) in FIG. 2 is the projection from sensor elements 43' in the target distance plane 45 determined through the momentary zoom focal distance in accordance with the laws of the geometric optics. When, during rotation 33 of the sensor element 43, the target object 12 is located in the interior, central region 47 of the receiving or detecting circles 46 which are described in the target distance plane 45, there is present a relative approach to the target in conformance with the kinematics of the target tracking. When the target object 12 then wanders out from the central region 47; in essence, is detected in the receiving circle 46, an angle indicator 48 which is triggered by the output signal of the sensor element 43, delivers an angle information 49 to a signal processing arrangement 50, which with consideration given to the momentary position in space of the control elements of the airborne body 11, and thereby also in relation to the momentary position of the target object 12, activates a target tracking-guidance device 51 for the emission of pitch and yaw guidance commands 52, so as to again orient the longitudinal axis 22 of the airborne body in a direction towards the target 12; in effect, to also again displace this into the central region 47 of the receiving circle 46.

The closer the approach of the intercepting airborne body 11 to the already acquired or detected target object 12, the more intensely is there reduced the surface of the central region 47 through a narrowing of the sighting or viewing angle 30, for example, through a corresponding change in the focal distance of the zoom optics 26 by means of the adjusting device 29, controlled from the signal processing arrangement 50. This narrowing of the sighting angle 30 for the precise target tracking guidance can be carried out in dependence upon time; more favorable aerodynamic conditions are obtained at a guidance pursuant to the extent of the actual remaining distance or range determined along the sighting line 31 by means of the range-finding device 18 in the arrangement 16, as is symbolically considered in FIG. 2 through the operational connection of the arrangement 16 with the device 50.

More favorable kinematic and aerodynamic condition in comparison with a pure target tracking or dragcurve navigation are obtained, as known, with the advance of the collision point pursuant to the proportional navigation, for which there must always be determined, on board of the intercepting airborne body 11, the angle of rotation of the sighting line 31; in effect, the drifting of the target object 12 over a period of time. As is more closely detailed in the applicants' above-mentioned German applications, through a slight modification in the apparatus it is possible that the previously mentioned sensor element 43.1 has a further sensor element 43.2 geometrically associated therewith in such a manner, as to be offset peripherally by an angle 53 relative to the former in the detecting or projecting plane 42, such that the annular surfaces of both receiving circles 46 will somewhat radially overlap. At geometrically and electrically coinciding sensor elements 43.1, 43.2, the center of the radiation energy 44 (which for purposes of simplification of the presentation of FIG. 2 is concurrently viewed as the center of the reflected beam energy 20) is maintained precisely in the middle of both receiving circles 46.1 and 46.2, when the two sensor elements 43.1 and 43.2 (offset by the time interval which is obtained from the angle 53 and the momentary rotation 33) deliver the same signal intensity to the signal processing arrangement 50. However; for example, when the outer sensor element 43.1 delivers a stronger signal intensity, this signifies that the target object 12 has wandered or drifted radially outwardly relative to the longitudinal axis 22 of the airborne body and, as a consequence the guidance arrangement 51 delivers guiding commands 52 for a corresponding spatial displacement of the longitudinal axis 22 of the airborne body, so that the target object 12 is again quickly located in the center of both receiving circles 46.1 and 46.2. Again, it is valid that during the course of approach to the target object the envisioning of the target object 12 becomes increasingly more precise, when the width of the sighting angle 30 is increasingly reduced (through a change in the zoom-focal distance; or through a change in the positioning distance of the sensor elements 43 relative to the longitudinal axis 22 of the airborne body).

As a result thereof, this will counteract a passing by at an excessively large distance; in essence, any exceedingly unfavorable relative approach orientation for the effectiveness of the warhead 13.

What is claimed is:

1. In a proximity fuzing arrangement for an airborne body equipped with reflective-beam range-finding means; the improvement comprising in that the path of a beam from said range-finding means extends through a point which is eccentrically offset with respect to the longitudinal axis of said airborne body and said point rotates about said axis; a focusing optics in said path of the beam, said point being located behind said focusing optics, and wherein the path of the beam in front of said focusing optics extends along a variable sighting angle relative to the longitudinal axis of the airborne body.

2. A proximity fuzing arrangement as claimed in claim 1, wherein substantially coincident paths of beams from the reflective-beam range-finding means and from a passive target searching and tracking arrangement extend through said focusing optics.

3. A proximity fuzing arrangement as claimed in claim 2, wherein said range-finding means comprises a laser transmitter for emanating radiation within the infrared spectrum and a receiver associated with said transmitter, said target searching and tracking arrangement including at least one sensor element for infrared energy within the frequency range of at least one atmospheric through-window.

4. A proximity fuzing arrangement as claimed in claim 1, wherein said point in the path of the beam is located in the plane of projection of said focusing optics having a variable focusing distance, such as a zoom objective.

5. A proximity fuzing arrangement as claimed in claim 1, wherein said focusing optics has a fixed focal point on the plane of projection pursuant to the variable position of the point in the path of said beam dependent upon the extent of a change in the sighting angle.

6. A proximity fuzing arrangement as claimed in claim 3, wherein a semi-transmissive reflector is located in the path of the beam in front of said transmitter and in front of receiver.

7. A proximity fuzing arrangement as claimed in claim 6, wherein a reflector is arranged at the point in the path of said beam; and a semi-permeable reflector is arranged behind said reflector along the longitudinal axis of the projectile, said transmitter being located outside of the plane of projection, and the receiver which is located in the plane of projection is located diametrically opposite the point relative to the longitudinal axis of the airborne body.

8. A proximity fuzing arrangement as claimed in claim 3, wherein at least two of said sensor elements overlapping each other to some extent in a radial direction relative to the longitudinal axis of the airborne body are peripherally offset with respect to each other in the plane of projection of said focusing optics.

9. A proximity fuzing arrangement as claimed in claim 1, wherein a motor forms a drive for a disc rotating concentrically about the longitudinal axis of the airborne body, said disc being equipped with the receiver of said range-finding means; a reflector in the plane of projection; and including at least one sensor element in proximity to the point in the path of the beam.

10. A proximity fuzing arrangement as claimed in claim 6, wherein a reflector is arranged at the point in the path of said beam; and a semi-permeable reflector is arranged behind said reflector along the longitudinal axis of the projectile, said receiver being located outside of the plane of projection, and the transmitter which is located in the plane of projection of said focusing optics is located diametrically opposite the point relative to the longitudinal axis of the airborne body.

11. A proximity fuzing arrangement as claimed in claim 1, wherein a motor forms a drive for a disc rotating concentrically about the longitudinal axis of the airbourne body, said disc being equipped with the transmitter of said range-finding means; a reflector in the plane of projection of said focusing optics; and including at least one sensor element in proximity to the point in the path of the beam.

* * * * *